(12) United States Patent
Underwood et al.

(10) Patent No.: US 8,436,767 B1
(45) Date of Patent: May 7, 2013

(54) APPARATUS AND METHOD FOR EXECUTING EQUIPMENT INSPECTION REQUIREMENTS

(75) Inventors: M. Valerie Underwood, Mount Laurel, NJ (US); Lillian Andres, Hamilton, NJ (US); Travis Lenhart, Bensalem, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 265 days.

(21) Appl. No.: 12/908,460

(22) Filed: Oct. 20, 2010

Related U.S. Application Data

(60) Provisional application No. 61/265,621, filed on Dec. 1, 2009.

(51) Int. Cl.
*G01S 7/40* (2006.01)
(52) U.S. Cl.
USPC ........................................................ 342/165
(58) Field of Classification Search .................. 342/165
See application file for complete search history.

(56) References Cited

U.S. PATENT DOCUMENTS

2008/0015802 A1\* 1/2008 Urano et al. ................... 702/81

\* cited by examiner

*Primary Examiner* — Timothy A Brainard
(74) *Attorney, Agent, or Firm* — Howard IP Law Group, PC

(57) ABSTRACT

A method executes inspections on equipment of a system. The method includes providing an equipment inspection location rule group for a piece of equipment in the system, the equipment rule group including one or more equipment inspection location rules about equipment inspection locations and expected values at said inspection locations, and actions to be commanded when sampled values match the expected values; selecting one or more of the equipment inspection location rules in a corresponding rule group, the selection being made according to a predetermined operating sequence of the equipment inspection location rules; determining if the selected one or more equipment inspection location rules has been satisfied; and executing one or more actions corresponding to the selected one or more equipment inspection location rules if the selected one or more equipment inspection location rules have been satisfied.

19 Claims, 4 Drawing Sheets

| | | | | | | | | |
|---|---|---|---|---|---|---|---|---|
| RuleTable FPA1FWDCabinetSupport | | | | | | | | |
| | Condition | Condition | Condition | Ruleflow-Group | No-Loop | Action | Action | Action |
| | fault: Fault | | | | | | | |
| | Inspection Location (II) | bitposition | checkValidILDataValue | | | System.out.println(fault.getTpdescription()); | fault.setTpresult("$param");update(fault); | System.out.println(fault.getTpresult()); |
| FPA Cabinet Support FDR rules | Inspection Location | Inspection Location Data Bit Position | Invalid Inspection Location Data Value (Comparison Result=1)? | | | Print Fault Description? | Set Fault | Print Fault Value? |
| Cabinet Overtemperture Latch | 10899 | 0 | 1 | Cabinet Overtemp Latch | True | X | Red/Fail | X |
| Cabinet Overtemperture Input | 10899 | 1 | 1 | Cabinet Overtemp Input | True | X | Red/Fail | X |
| Any PS Overtemperature 1 | 10840 | 0 | 1 | Cabinet PS Overtemps | True | X | Red/Fail | X |
| ... | ... | ... | ... | ... | ... | ... | ... | ... |

Figure 4

APPARATUS AND METHOD FOR EXECUTING EQUIPMENT INSPECTION REQUIREMENTS

RELATED APPLICATION

This application claims the benefit of U.S. Provisional application 61/265,621, filed Dec. 1, 2009.

This invention was made with Government Support under Contract No. N00024-03-C-5115 awarded by the Department of the Navy. The Government has certain rights in this invention.

BACKGROUND

Modern radar systems are extremely complex, and are subject to numerous types of faults which, if allowed to persist, may adversely affect the radar mission or result in damage to the radar system itself. In some cases, such as in military applications, the mission of the radar may be of extreme importance, and failure may have drastic results.

For this reason, radar systems may include inspection locations at which analog values of electrical, thermal or other parameters may be monitored to verify that they are within predetermined values deemed to be satisfactory, and so that corrective action can be taken should the values move in a direction which is deemed to be undesirable. FIG. 1 is a simplified block diagram of a Radar Transmitter Signal Processor Group Equipment portion 12 of a prior art radar system 10 with hardware and software for monitoring various analog electrical values of the radar transmitter group equipment 12. In FIG. 1, radio-frequency (RF) signals from an exciter (not illustrated) are applied by way of a path 16 to a monitor or modulator illustrated as a block 14. The RF is modulated in block 14 to produce modulated RF signal (MRFS), which is applied to a driver/predriver illustrated as a block 18. The driver/predriver amplify the modulated RF signal to produce driven RF signal (DRFS), which is applied over a path 19 to a final power amplifier (FPA) 20. The final power amplifier 20 amplifies the driven RF signal to produce power RF signal (PRFS) for application to an antenna group (not illustrated). The final power amplifier 20 receives high voltage from a high voltage power supply (HVPS) 22. The high voltage power supply may also provide high voltage to the driver/predriver 18, as suggested by dash-line conductor 17. It should be noted that the various elements of the radar transmitter signal processor group equipment portion 12, are housed in "cabinets." This "cabinet" terminology should not be taken too literally, as each of the modulator 14, driver/predriver 18, FPA 20, and HVPS 22 may occupy several actual or physical equipment cabinets, well known in the art, which are interconnected by appropriate cabling or waveguides.

In the arrangement of FIG. 1, each of the modulator 14, driver/predriver 18, FPA 20, and HVPS 22 elements of the radar transmitter signal processor group equipment portion 12 handles electrical, thermal or other parameters which are in their actual analog form, rather than being in symbolic form such as digital equivalents. Thus, the various elements such as the modulator 14, the driver/predriver 18, the FPA 20, and the HVPS 22, require monitoring of the analog values.

In FIG. 1, a set 24 of control fault logic assemblies (CFLAs) includes a plurality of individual control fault logic assemblies. One control fault logic assembly is associated with each of the modulator 14, driver/predriver 18, final power amplifier (FPA) 20, and high voltage power supply (HVPS) 22. More particularly, a control fault logic assembly 24a is associated with the FPA 20, a control fault logic assembly 24b is associated with HVPS 22, a control fault logic assembly 24c is associated with driver/predriver 18, and a control fault logic assembly 24d is associated with the modulator 14. Each of these control fault logic assemblies 24a, 24b, 24c, and 24d receives specific addresses and commands in digital form over a bus 26 from an operational resources test system (ORTS) processor 28, and translates the addresses and commands into the analog world, by making hardware connections to the specific analog inspection location identified by the locations and commands, and by sampling the analog values and converting the sampled analog values into digital equivalents that may be sent, as by way of path 26, to monitoring equipment such as ORTS processor 28.

In the prior art arrangement of FIG. 1, a general-purpose computer 30 contains the ORTS processor 28 and a display monitor. The ORTS processor is preprogrammed with code which is responsive to sampling and execution commands from the general-purpose computer. That is, the software code with which ORTS processor 28 is loaded is written according to specific inspection requirements set by hardware engineers and entered by software engineers (represented by block 35 on FIG. 1), compiled into binary format, and linked and loaded into a build suitable for running on the computer processor 30. Once this build is created, it is static. No changes are possible without restarting the examine requirements, writing corresponding code, compiling the code, link and load code procedure, as set forth in block 35 of FIG. 1. These inspection requirements may include the analog characteristic (voltage, current, frequency, phase, temperature, and the like) to be tested, the bus location, the return bit value on the bus, which is the actual value of each and every bit at the queried address that indicates the state of the hardware, the expected bit value, and the like. If the hardware changes or bugs are found, new code must be developed to accommodate the changes. At the time that the new code is to be developed, the person developing the code may have forgotten details of the code philosophy, with the result that development of the new code may be very time-consuming as old records are reviewed. In addition, it may be expected that human error may introduce problems into the resulting code. Most importantly, when software changes and requirements are not updated to match, information may be lost.

Improved methods for inspection of hardware locations is or are desired.

SUMMARY

A method according to an aspect of the disclosure is for inspecting equipment of a system. The method comprises providing an equipment inspection location rule group for a piece of equipment in the system, the equipment rule group including one or more equipment inspection location rules about equipment inspection locations and expected values at said inspection locations, and actions to be commanded when sampled values match the expected values; selecting one or more of the equipment inspection location rules in a corresponding rule group, the selection being made according to a predetermined operating sequence of the equipment inspection location rules; determining if the selected one or more equipment inspection location rules has been satisfied; and executing one or more actions corresponding to the selected one or more equipment inspection location rules if the selected one or more equipment inspection location rules have been satisfied.

An apparatus according to another aspect of the disclosure is for inspecting equipment of a system. The apparatus comprises a processor executing instructions for providing an equipment inspection location rule group for a piece of equipment in the system, the equipment rule group including one or more equipment inspection location rules about equipment inspection locations and expected values at said inspection locations, and actions to be commanded when sampled values match the expected values; selecting one or more of the equipment inspection location rules in a corresponding rule group, the selection being made according to a predetermined operating sequence of the equipment inspection location rules; determining if the selected one or more equipment inspection location rules has been satisfied; and executing one or more actions corresponding to the selected one or more equipment inspection location rules if the selected one or more equipment inspection location rules have been satisfied.

A computer readable medium according to a further aspect of the disclosure for inspecting equipment of a system. The computer readable medium comprises instructions for controlling an operating sequence of an equipment inspection location rule group for a piece of equipment in the system, the equipment rule group including one or more equipment inspection location rules, the equipment inspection location rules including equipment inspection locations and expected values at said inspection locations, and actions to be commanded when sampled values match the expected values; instructions for selecting, according to the predetermined operating sequence of the equipment inspection location rules, one or more of a plurality of equipment inspection location rules; instructions for determining if the selected one or more equipment inspection location rules has been satisfied; and instructions for executing one or more actions corresponding to the selected one or more equipment inspection location rules if the selected one or more equipment inspection location rules have been satisfied.

BRIEF DESCRIPTION OF THE DRAWINGS

Like elements in the drawings are designated by like reference numerals.

FIG. 3 is an exemplary logic flow diagram for a final power amplifier cabinet overtemperature inspection and FIG. 4 is an exemplary inspection location requirements table in the form of a spreadsheet for final power amplifier cabinet overtemperature inspection; FIGS. 3 and 4 are examples of the requirements data inputs into the inspection harness software program running on the general-purpose computer of FIG. 2 to perform a power amplifier cabinet overtemperature inspection.

DETAILED DESCRIPTION

Figure 1:
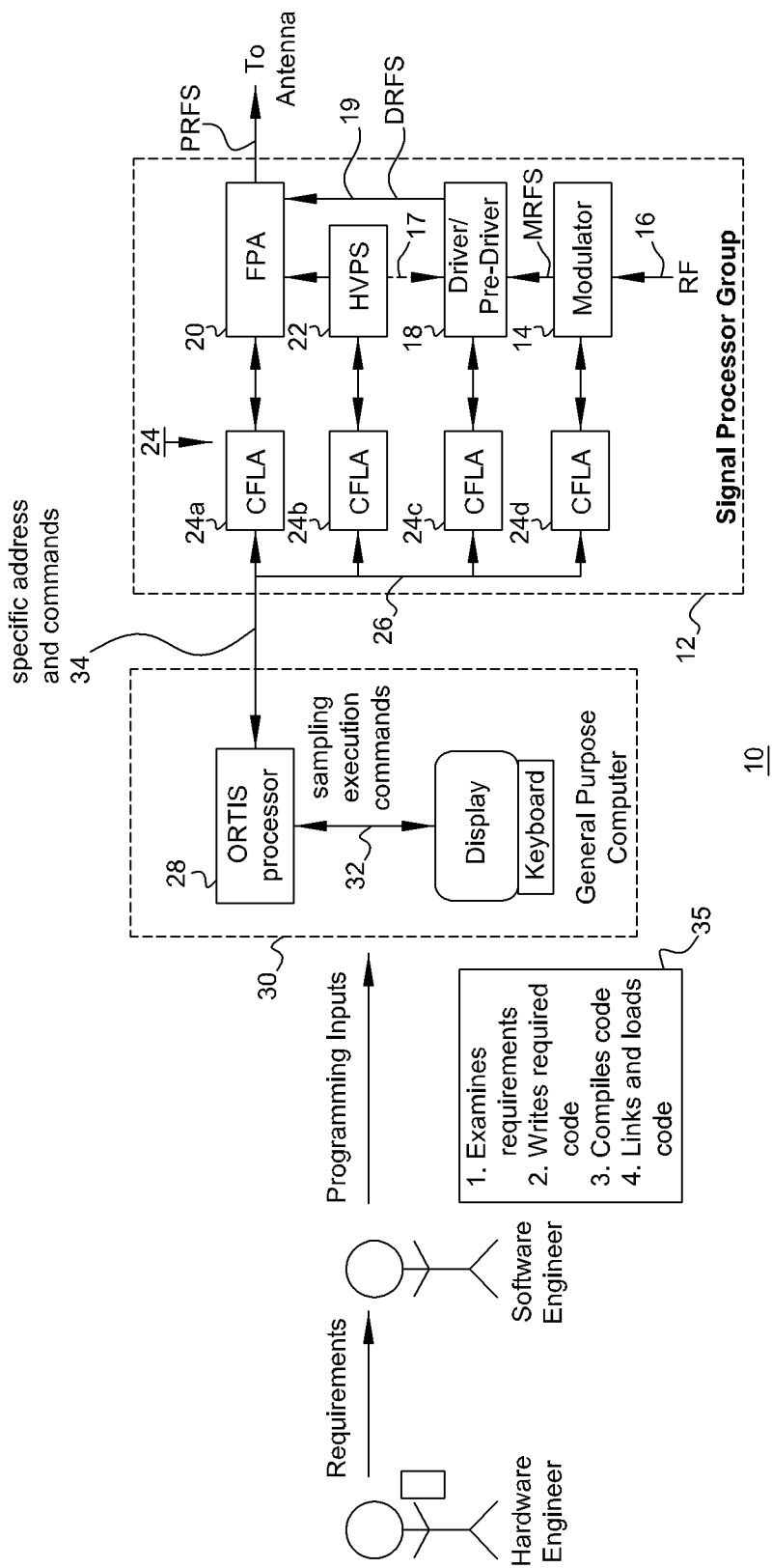
FIG. 1 is a simplified block diagram of a portion of a prior-art radar system, including portions relating to the analog processing of the signals to be transmitted, and showing control fault logic assemblies associated with certain ones of the analog processing elements.
Figure 2:
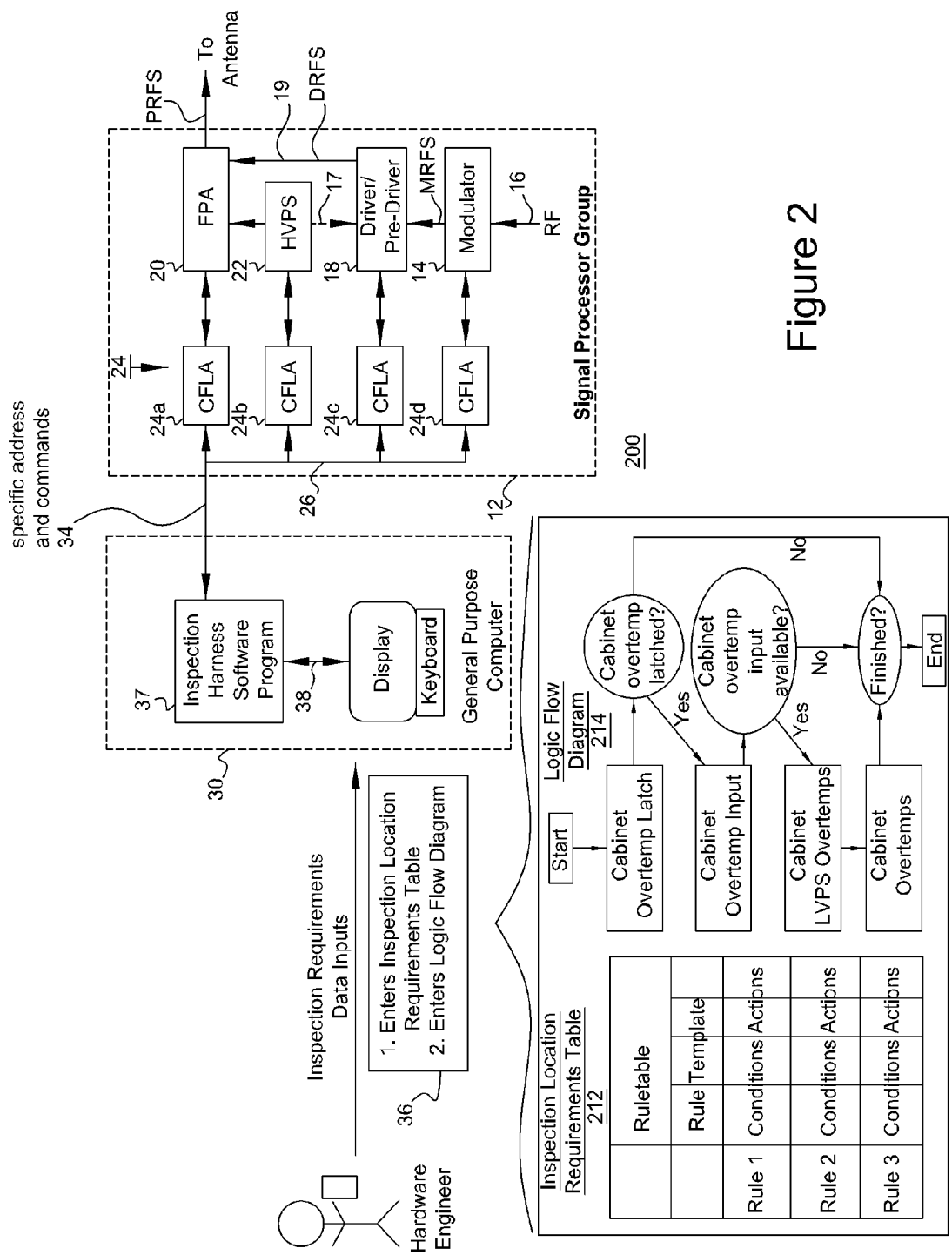
FIG. 2 is a simplified block diagram of a portion of an exemplary embodiment of a radar system according to an aspect of the disclosure, including portions relating to the analog processing of the signals to be transmitted, and showing control fault logic assemblies associated with certain ones of the analog processing elements.

The radar system portion of FIG. 2 differs from the prior art radar system portion of FIG. 1 in that the functions represented by block 35 of FIG. 1 are not needed in the radar system portion of FIG. 2, and in that a hardware engineer directly generates an inspections requirement table and logic flow diagram in block 36 of FIG. 2, as input data to an Inspection Harness Software Program 37 of FIG. 2 to run on a general-purpose computer 30.

Figure 3:
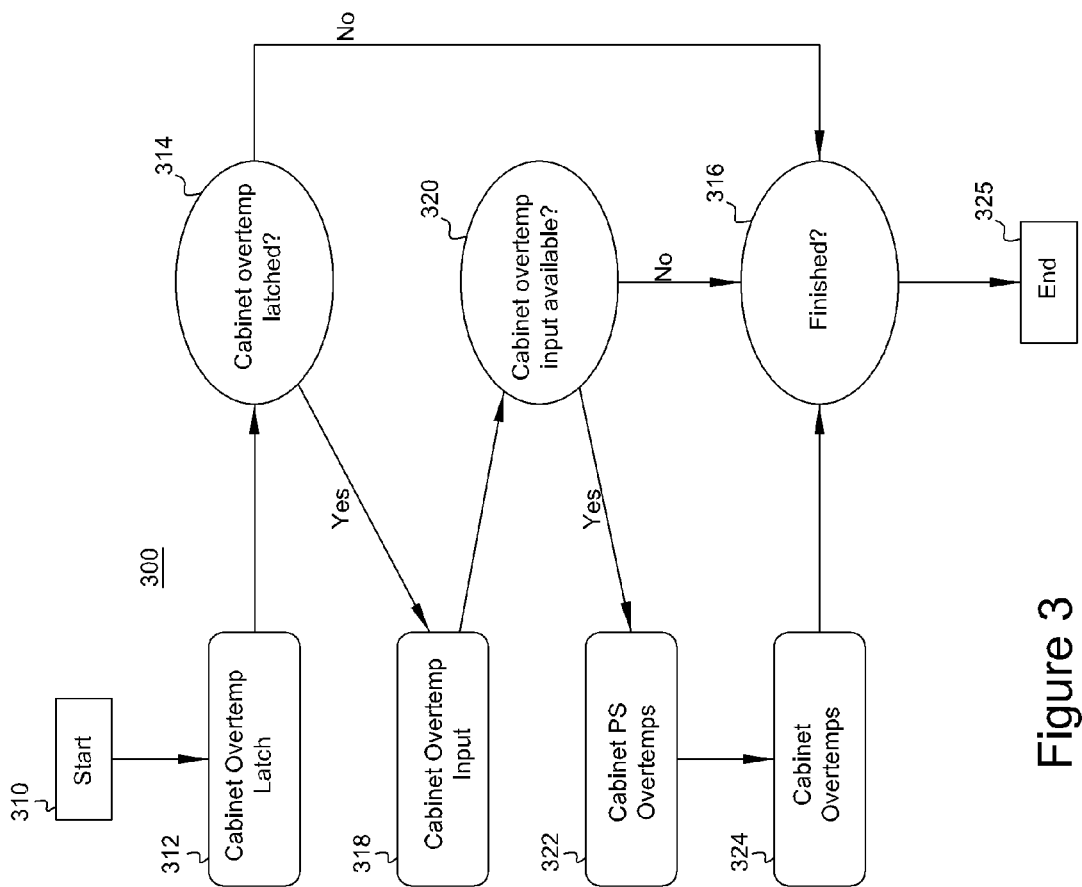

Specialized hardware typically define locations on buses that contain values indicating the state of the hardware. The bus address or inspection location, and the expected value of the location make up the "condition" for a test. These conditions are delineated in a simple decision table termed the "Inspection Location Requirements Table" 212 of FIG. 2. According to an aspect of the disclosure, the engineer generates an Inspection Location Requirements Table designated 212 of FIG. 2 and a logic flow diagram designated 214. FIG. 3 is an illustration of an exemplary logic flow which may be used as diagram 214 of FIG. 2, and the table 400 of FIG. 4 is a simplified illustration of details of the exemplary Inspection Location Requirements table 212 of FIG. 2.

A spreadsheet is a format in which information is stored in the form of rows and columns, defining data-containing cells at their intersections. In table 400 of FIG. 4, rows 401, 402, 403, and 404 represent software, and rows 405 through 409 represent data. Also in FIG. 4, column 410 lists the labels of rules, and columns 412 through 416 represent possible conditions of corresponding software and data of various rules. Column 418 represents Ruleflow-group, a label used for linking to the logic flow diagram 214 and 300 of FIGS. 2 and 3, respectively. Column 420 represents a value or flag which is used to prevent unwanted multiple instances or duplicates of evaluations. Columns 422 through 426 represent actions that must be taken if all the conditions of a rule are satisfied. All parts of this artifact are in the form of a spreadsheet as they are organized into cells that are defined by rows and columns. Some cells contain software definitions while others contain data that is parsed by the rule engine into rules; a portion of that data is used for the specification syntax of a given rule while the rest serves as parametric data for use within that rule. As mentioned, certain rows are considered to be "rules." Rules 1, 2, and 3 appear in rows 406, 407, and 408, and are represented as continuing by a row 409. A condition (or decision) resides on or occupies the left side 214a of each row, and the corresponding action resides on the right side 216a of each row. The actions appear in a right-most position 216a of each row. The usual term for a table such as that of FIG. 4 is a "decision table," and such tables are used in many disciplines.

The heading "Ruletable FPA1FWDCabinetsupport" of the table 400 of FIG. 4 identifies the decision table by reference to its function. The column headed "ruleflow-group" represents a link or synchronization point between the logic flow diagram 300 of FIG. 3 and the decision table 400 of FIG. 4. The flow of the execution of these rules is determined by "Logic Flow Diagram" 214 of FIG. 2, illustrated in more detail in FIG. 3. The format of both the "Inspection Location Requirements Table" 212 and the "Logic Flow Diagram" 214 are so well known as to be intuitive to the writer of hardware inspection requirements.

According to an aspect of the disclosure, executable requirements for hardware inspection location tests are generated or developed, where the requirements are in a form selected to be easily understood and readable by technical personnel and also immediately executable by the executable program. More particularly, the entire requirements of a test, including (a) inspection locations, (b) inspection location expected values, (c) inspection location actual bit values and (d) operations, actions, and logic are used as data input to an Inspection Harness Software Program 37 of FIG. 2. Thus, the Inspection Harness Software Program 37 runs the logic flow diagram 214 and the Inspection Location Requirements table 212. The Inspection Harness Software Program can be run with any such tests dynamically. The static process of writing code from a requirements document, compiling code, linking and loading code is or are eliminated. Instead, software simply executes the requirements as they are. The same human-readable format of the requirements is also the executable form.

FIG. 3 illustrates details of the logic flow 300 of diagram 214. FIG. 3 is an example of how the method can be used for a specific test on the FPA Cabinet 20 for the final power amplifier. It should be understood that the method can be used for testing other types of equipment and apparatus. The specific test of FIG. 3 addresses the issue of whether there is an over temperature problem. The logic flow diagram 214 of FIG. 2 and 300 of FIG. 3 controls the sequence in which the rule rows of the "Inspection Location Requirements Table" 212 of FIG. 2 and 400 of FIG. 4 are selected. The block names (blocks numbered 312, 318, 322, and 324) in the logic flow diagram of FIG. 3 correspond to the names for each row of the Rulesflow-group column in the table of FIG. 4. In other words, the logic flow of FIG. 3 determines the order of how the rows in FIG. 4 can be or are executed. For this particular example, the test is rather simple.

The logic 300 of FIG. 3 begins at a START block 310, and flows to a block 312, which represents the state for evaluation of a rule relating the cabinet overtemperature latch, representing, if latched, that the cabinet in question or under examination is tested further to determine why the latch is set. The state of the cabinet overtemperature latch 312 leads to the Rule 1 (line 406) evaluation of FIG. 4. In any Rule, if the cells contain a null value, that condition is ignored. Rule 1 has three non-null values, namely "10899," "0,", and "1". Thus, all three conditions are evaluated. For Rule 1, at inspection location or digitized thermometer 10899, the data bit position designated as "0" (column 414) is evaluated for the presence of a logic 1 (column 416). If the value at data position 0 is 1, a fault is indicated. As a result of the indicated fault, the actions of columns 422, 424, and 426 are taken from left to right. Thus, the action of column 422 at row 406 is an "X", thereby indicating that the software action or routines of row 404, column 422 will be executed. From column 424, row 406 the parameter RED/FAIL executes the software routine(s) listed at column 424, row 404. From column 426, row 406 the cell is filled with an "X" representing the execution of the software routine(s) of column 426, row 404. That completes the evaluation of Rule 1 of row 406. The completion of the Rule 1 actions results in transition from logic block 312 of FIG. 3 to decision point or block 314 of FIG. 3. Decision block 314 of FIG. 3 determines if the previously executed rule has determined that the cabinet overtemperature latch has been set. If the overtemperature latch has been set, the logic of FIG. 3 flows by the YES output to a state block 318. State block 318 represents cabinet temperature input, which corresponds to the second rule of FIG. 4. The cabinet overtemperature input is a binary value that represents the state including the sensing of at least one overtemperature value. Rule 2 of line 407 of FIG. 4 inspects the same inspection location as Rule 1, namely 10899. Unlike Rule 1, Rule 2 measures inspection location data bit position 1, and responds to a fault data value of "1." If a fault data value of "1" matches with the value shown at row 407, column 416, an overtemperature fault is deemed to have occurred, and the actions of Rule 2 at columns 422, 424, and 426 are initiated in the specified order. Once the actions of Rule 2 at columns 422, 424, and 426 are completed, control returns to cabinet overtemperature evaluation state block 318 of the logic of FIG. 3.

From block 318 of FIG. 3, the logic 300 flows to a decision block 320, which represents a determination of whether a cabinet overtemperature input was available. If a cabinet overtemperature input was available, the logic 300 leaves decision block 320 by the YES output, and arrives at a cabinet power supply overtemperature state block 322. That is, if there was at least one overtemperature value present in the set of all overtemperature values of the cabinet power supply, then the logic progresses to state block 322. Control returns to Rule 3 of row 408 of FIG. 4. An evaluation is conducted of the 0 data bit position of location 10840, which is a different address or location than 10899. The fault-indicating value at the 0 data bit position, as suggested by column 414 at row 408, is logic 1, as suggested by column 416 at row 408. If a fault is indicated, the actions taken are suggested by the actions columns 422, 424, and 426 at row 408. When the actions are completed, control returns to logic 300 of FIG. 3. The evaluation is to determine if at least one cabinet overtemperature has occurred. From block 322 of FIG. 3, the logic 300 flows to a state block 324, which represents cabinet overtemperature. Block 324 represents evaluation of each overtemperature value of the set of all possible overtemperature values in the cabinet in question. There is a further set of rules associated with FIG. 4 which correspond to the state of block 324; these rules are not specifically illustrated, but are suggested by row 409. When the actions associated with block 324 are completed, the logic of FIG. 3 flows to a "logic finished" block 316, and thence to an END block. In the event that the cabinet overtemperature latch was found not to be latched in decision block 314, or if the cabinet overtemperature input was found not to be available in decision block 320, the logic 300 of FIG. 3 flows to finished block 316 and ends at the END block 325.

A person of ordinary skill in the art will know how to implement a decision table such as that of FIG. 4 and a control or logic sequence such as that of FIG. 3, and to cause the logic to control the sequencing of the rules.

The Inspection Harness Software Program, block 37 in FIG. 2 represents the framework through which the inspection requirements table and logic flow diagram are directly executed. In other words, the table and diagram serve as input to the harness that defines the inspection to be executed on the hardware. The harness then executes that inspection, returning as output the results to the engineer. This program interprets the table and logic flow instructions. The program utilizes a solution from the computer science branch of knowledge engineering and artificial intelligence. An "inference engine" is the underlying software component in the harness. The inference engine is a finite state machine with three action states: match rules, select rules, and execute rules. These states are determined by the input of the inspection requirements table and logic flow diagram. The procedure by which to construct an inspection harness software program that is used to interact with an inference engine is well understood in the art.

Once the Inspection Harness Software program is developed and installed, an engineer wishing to use the interacting logic and spreadsheet decision table can simply start to work with the spreadsheet 400 and the logic 300 in any order, or simultaneously.

Thus the combination of the "Inspection Location Requirements Table" and the "Logic Flow Diagram" constitute the data for "Inspection Harness Software Program" for the test, in this example, the cabinet over temperature test.

Starting with the logic flow diagram 300, in this example, for the Final Power Amplifier Cabinet Support test and beginning at the Start state block 310, the engineer can easily trace the visibly recognizable sequence of inspections that will be performed as the focus of control logic flows from ruleflow-group state blocks (blocks 312, 318, 322, and 324) to decision state blocks (blocks 314, 316, and 320, from decision state blocks to ruleflow-group state blocks, and from decision state blocks to other decision state blocks, each by their corresponding set of input and output transition arrows, and ending the flow with a final transition to the End state block 325. For any ruleflow-group within the logic flow diagram 300, once the control focus moves to a ruleflow-group with a given textual label, the control focus shifts to the inspection location requirements table 400 implemented as a decision table, and specifically, to those rows and only those rows whose spreadsheet cell under the Ruleflow-Group column (block 418) matches the ruleflow-group label within the logic flow diagram 300. Since the label of the ruleflow-group-indicating cell located at row 406, column 418 in FIG. 4 is "Cabinet Overtemp Latch," this label must match the label of the logic flow diagram state block 312 in FIG. 3 of the same name. As there is only one rule present in the decision table 400 with this "Cabinet Overtemp Latch" label, which is Rule 1 at row 406, this is the only rule present in this specific ruleflow-group and as such will be considered for evaluation as a ruleflow-group. Likewise, since the label of the ruleflow-group-indicating cell located at row 407, column 418 in FIG. 4 is "Cabinet Overtemp Input" and is present only within this row, this ruleflow-group also only contains one rule, which is Rule 2 at row 407, and matches with its logic flow diagram state block 318 in FIG. 3. Lastly, the ruleflow-group labeled "Cabinet PS Overtemps" at row 408, column 418, which contains the singular rule called "Any PS Overtemperature 1" matches logic flow diagram state block 322 in FIG. 3 with the same name. As shown by these examples, this type of connection arises from the underlying nature of the inspection harness software program (block 37). With the focus of control now shifted to these rows consisting of a common ruleflow group, the rows are concurrently evaluated as a group of rules with each rule within that group of rules being individually evaluated in a left-to-right manner until evaluation of all rows in the group has been completed and the results of the evaluation of each row have been stored for eventual decision point state block evaluation in the logic flow diagram 300. After all rules within the ruleflow group have been evaluated (of the three unique ruleflow groups shown in column 418 of FIG. 4, only one rule is present in each), the focus of control shifts back to the logic flow diagram 300; whereupon the test proceeds to its next logic flow diagram state block and shifts back to the decision table 400 when another ruleflow group is encountered, continuing in this manner until test completion.

As the logic flow diagram 300 depicts the control flow logic of a specific inspection sequence at a macroscopic level of description, the test flow is easily understandable. For any given ruleflow group within that logic flow diagram, its corresponding ruleflow-group label-matched rows are also clearly identified at a lower level of description for that inspection sequence. As row evaluations are performed and the results recorded for each, one can also readily see, for any given set of inspection scenario input conditions, which of the set of rows under evaluation have satisfied their necessary evaluation conditions and thus are able to execute their associated actions and which of those have not met their necessary evaluation conditions and thus are not able to execute their associated actions. For those rows whose evaluations have not occurred, due to the current set of input values, it can also be readily determined which of the necessary evaluation conditions have not been met for the current evaluation inputs via direct examination of these condition evaluations.

One of the benefits of using the decision table to implement the conditional logic of the various aspects of an inspection sequence as defined by the logic flow diagram is the ease in which one can modify the spreadsheet cell contents within the decision table to correct, enhance, or entirely redefine the inspection sequence evaluations. First, rule Conditions can be added, removed, or modified for any given rule to more closely match the minimal set of necessary conditions needed to successfully evaluate a rule. This can be done simply by using a spreadsheet processing software application, such as Excel or Calc residing on a general purpose computer, such as that of block 30 of FIG. 1, to first load into the application the file that contains the contents of this decision table in the form of a spreadsheet and then to directly manipulate the desired Conditions using the text processing functionalities that the spreadsheet application has to offer. Specifically, entire columns denoting Conditions can be added or removed by adding or removing, respectively, one or more columns to/from the spreadsheet anywhere within the block of Conditions denoted by block 214a in FIG. 4 and if any data is to be entered, populating their cells with the desired content. Modifications made to the cell contents of specific Conditions can be performed anywhere within the boundaries of individual columns. Secondly, rule Actions can be added, removed, or modified for any given rule to more closely match the set of desired actions that need to be performed once the corresponding set of necessary conditions have been met. Similar to the way in which columns of Conditions can be manipulated to add, remove, or change Condition definitions, one or more columns of Actions can also be directly manipulated by similar means but with the additional constraint of having to be performed anywhere within the block of Actions denoted by block 216a in FIG. 4. Lastly, entire rows that each constitutes a decision table-defined rule can be added, removed, or modified to more closely match the set of rules to be considered for evaluation for any given ruleflow group. In order to add, remove, or modify Rules, rows, rather than columns, have to be directly manipulated. These manipulations can take the form of the addition of one or more rows and populating them with new data specific to the new Rule added, or the complete removal of one or more row contents from the spreadsheet in the case of Rule removal. Similar to the changes required for Condition modification, Rule modification requires that at least one cell within the bounds of an individual rule has to be performed. Moreover, all types of Rule manipulations, such as additions, removals, and modifications, are required to be performed within the boundaries of the Rule definitions indicated by the region of decision table 400 anywhere below row 405 in FIG. 4.

Thus, a beneficial use of the disclosure lies in the capability of the hardware engineer to enter his requirements in a human-readable format (the Logic Flow Diagram and the Inspection Location Requirements Table) that is directly executable by the Inspection Harness Software Program, thereby allowing execution or tests for the specific hardware group.

Although the method has been described in terms of exemplary embodiments relating to equipment inspection of radar systems, they are not limited thereto. Rather, the appended claims should be construed broadly, to include other types of complex systems comprising multiple hardware elements and embodiments of same, which may be made by those skilled in the art without departing from the scope and range of equivalents of same.

What is claimed is:

1. A method for inspecting equipment of a system, the method comprising:

(a) providing an equipment inspection location rule group for a piece of equipment in the system, the equipment rule group including one or more equipment inspection location rules about equipment inspection locations and expected values at said inspection locations, and actions to be commanded when sampled values match the expected values;

(b) selecting, in a computer process, one or more of the equipment inspection location rules in the rule group, the selection being made according to a predetermined operating sequence of the equipment inspection location rules;

(c) determining, in a computer process, if the selected one or more equipment inspection location rules has been satisfied; and (d) executing one or more actions corresponding to the selected one or more equipment inspection location rules, in a computer process, if the selected one or more equipment inspection location rules have been satisfied.

2. A method according to claim 1, further comprising performing steps (b), (c) and (d) for one or more of any unselected ones of the equipment inspection location rules according to the predetermined operating sequence.

3. A method according to claim 1, wherein the system comprises a radar system.

4. A method according to claim 1, wherein the equipment comprises a signal processor.

5. A method according to claim 1, wherein the equipment comprises a signal processor group.

6. A method according to claim 1, wherein the system comprises a radar system and the equipment comprises a radar signal processor group.

7. A method according to claim 1, further comprising providing an equipment inspection location rule group for two or more additional pieces of equipment in the system, wherein steps (b), (c), and (d) are performed sequentially for the pieces of equipment in the system or concurrently for one or more pieces of the equipment in the system.

8. An apparatus for inspecting equipment of a system, the apparatus comprising:
    a processor executing instructions for:
        (a) providing an equipment inspection location rule group for a piece of equipment in the system, the equipment rule group including one or more equipment inspection location rules about equipment inspection locations and expected values at said inspection locations, and actions to be commanded when sampled values match the expected values;
        (b) selecting one or more of the equipment inspection location rules in the rule group, the selection being made according to a predetermined operating sequence of the equipment inspection location rules;
        (c) determining if the selected one or more equipment inspection location rules has been satisfied; and
        (d) executing one or more actions corresponding to the selected one or more equipment inspection location rules if the selected one or more equipment inspection location rules have been satisfied.

9. An apparatus according to claim 8, further comprising performing steps (b), (c) and (d) for one or more of any unselected ones of the equipment inspection location rules according to the predetermined operating sequence.

10. An apparatus according to claim 8, wherein the system comprises a radar system.

11. An apparatus according to claim 8, wherein the equipment comprises a signal processor.

12. An apparatus according to claim 8, wherein the system comprises a radar system and the equipment comprises a radar signal processor group.

13. An apparatus according to claim 8, further comprising providing an equipment inspection location rule group for two or more additional pieces of equipment in the system, wherein steps (b), (c), and (d) are performed sequentially for the pieces of equipment in the system or concurrently for one or more pieces of the equipment in the system.

14. A non-transitory computer readable medium for inspecting equipment of a system, the non-transitory computer readable medium including instructions executable by a processor for:
    (a) controlling an operating sequence of an equipment inspection location rule group for a piece of equipment in the system, the equipment rule group including one or more equipment inspection location rules, the equipment inspection location rules including equipment inspection locations and expected values at said inspection locations, and actions to be commanded when sampled values match the expected values;
    (b) selecting, according to the predetermined operating sequence of the equipment inspection location rules, one or more of a plurality of equipment inspection location rules;
    (c) determining if the selected one or more equipment inspection location rules has been satisfied; and
    (d) executing one or more actions corresponding to the selected one or more equipment inspection location rules if the selected one or more equipment inspection location rules have been satisfied.

15. A non-transitory computer readable medium according to claim 14, further comprising instructions for performing (b) through (d) for one or more of any unselected ones of the equipment inspection location rules according to the predetermined operating sequence.

16. A non-transitory computer readable medium according to claim 14, wherein the system comprises a radar system.

17. A non-transitory computer readable medium according to claim 14, wherein the equipment comprises a signal processor.

18. A non-transitory computer readable medium according to claim 14, wherein the system comprises a radar system and the equipment comprises a radar signal processor group.

19. A non-transitory computer readable medium according to claim 14, further comprising providing an equipment inspection location rule group for two or more additional pieces of equipment in the system, wherein steps (b), (c), and (d) are performed sequentially for the pieces of equipment in the system or concurrently for one or more pieces of the equipment in the system.

* * * * *